United States Patent [19]

Zilberman et al.

[11] Patent Number: 5,450,761
[45] Date of Patent: Sep. 19, 1995

[54] TORQUE METER

[75] Inventors: Jossef Zilberman; Robert E. Munyon, both of Columbia; Steve D'Ercole, Glen Burnie, all of Md.

[73] Assignee: KOP-FLEX, Inc., Harmans, Md.

[21] Appl. No.: 269,588

[22] Filed: Jul. 1, 1994

[51] Int. Cl.6 .............................................. G01L 3/02
[52] U.S. Cl. ........................ 73/862.329; 73/862.324; 73/862.326; 73/862.328; 73/862.335; 73/862.04; 73/862.041
[58] Field of Search .................. 73/862.329, 862.324, 73/862.326, 862.328, 862.335, 862.04

[56] References Cited

U.S. PATENT DOCUMENTS

| | | |
|---|---|---|
| 2,073,206 | 3/1937 | Guthrie et al. . |
| 3,194,065 | 7/1965 | Wilson . |
| 3,208,274 | 9/1965 | Rosaler . |
| 3,504,538 | 4/1970 | Andrews et al. . |
| 3,538,762 | 11/1970 | Parkinson et al. . |
| 3,548,649 | 12/1970 | Parkinson .......................... 73/136 |
| 3,572,106 | 3/1971 | Jonas ................................. 73/136 |
| 3,587,305 | 6/1971 | Parkinson ...................... 73/136 A |
| 3,824,848 | 7/1974 | Parkinson . |
| 3,888,116 | 6/1975 | Spinella . |
| 3,940,979 | 3/1976 | Ward et al. . |
| 4,096,743 | 6/1978 | Diamond . |
| 4,122,708 | 10/1978 | Maier . |
| 4,136,559 | 1/1979 | Brown . |
| 4,590,806 | 5/1986 | Lutton et al. . |
| 5,197,338 | 3/1993 | Heiman et al. .................. 73/862.29 |
| 5,228,349 | 7/1993 | Gee et al. . |
| 5,257,535 | 11/1993 | Evans .................................. 73/168 |
| 5,285,699 | 2/1994 | Walls ................................. 74/572 |

Primary Examiner—Hezron E. Williams
Assistant Examiner—Jewel V. Artis
Attorney, Agent, or Firm—Cushman Darby & Cushman

[57] ABSTRACT

A torque measuring device utilizing composite and ferromagnetic materials includes an elongated shaft which is fixed at one end to a hollow or solid shaft with the other end being free of attachment to the shaft and including a plurality of circumferentially and evenly disposed signalling generator projections which are interleaved with similarly shaped projections mounted on a second member attached to the shaft so as to position the signal generating fingers in interspaced relationship about the circumference of the shaft body; at least two detecting sensors are located adjacent the projecting interspaced fingers in the same plane and spaced 180° apart from each other to minimize or eliminate any inaccuracies in measuring the torque reflected in non-arcuate variations in the spacing between the fingers of one member relative to the other member.

18 Claims, 3 Drawing Sheets

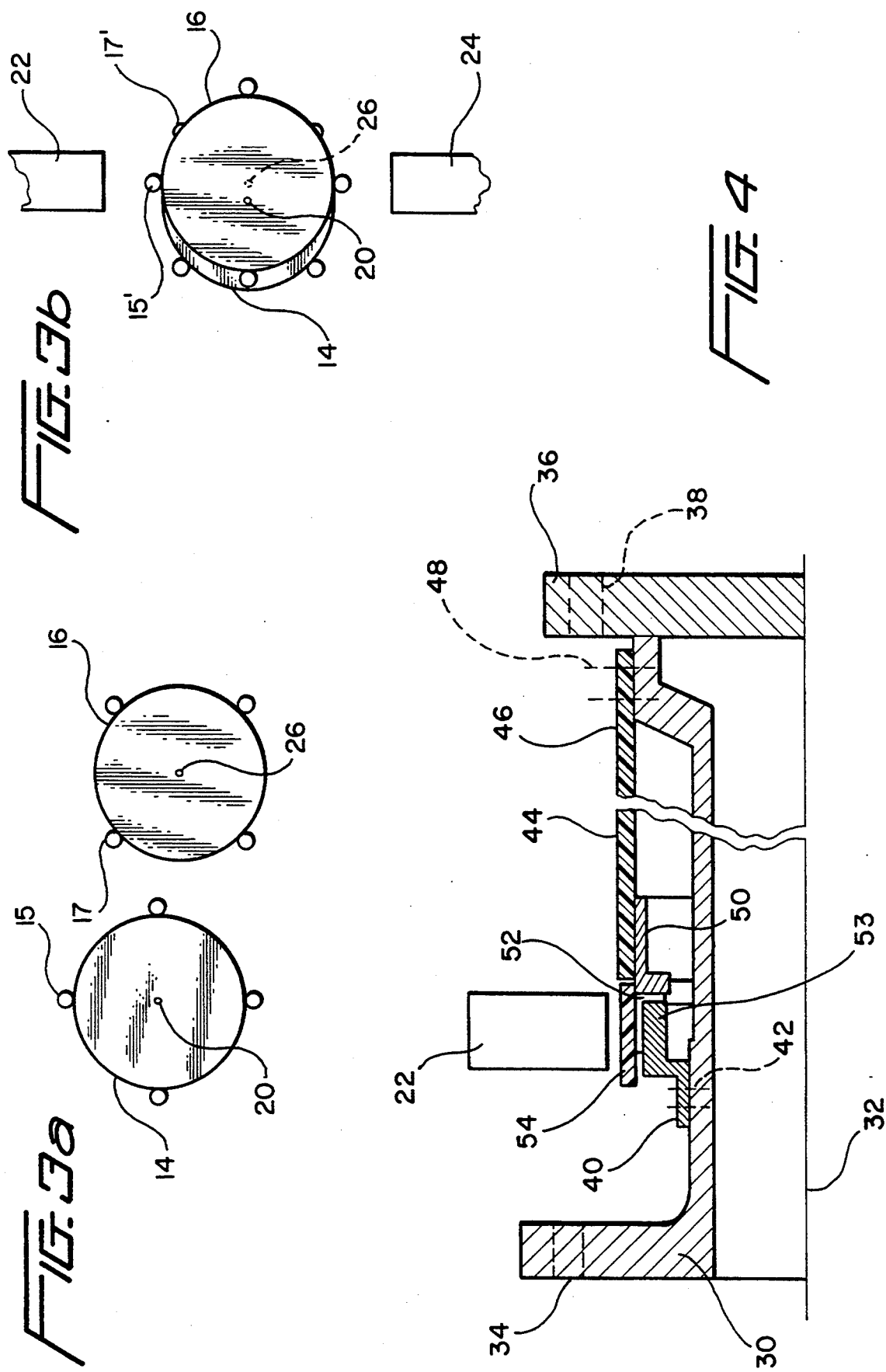

TORQUE METER

BACKGROUND OF THE INVENTION

The present invention relates to an apparatus for measuring torque in a rotating shaft and specifically a cantilevered composite sleeve attached to the shaft at one end and free from the shaft at the other end and which carries in circumferentially spaced apart relationship, signal generating elements which are read by circumferentially spaced apart sensors located to minimize inaccuracies in the measurements taken resulting from bending of the shaft being tested.

BACKGROUND OF THE INVENTION

It has long been the practice to measure the magnitude of torque on a rotating shaft such as a drive shaft in order to minimize failures as a result of prolonged or strenuous use of the shaft in its intended environment, and to monitor the power and efficiency of the entire drive train.

To this end, the prior art has developed a number of torque sensing devices which generate a visual, magnetic, electrical or optical signal in operation which signal varies in response to the rotation of the shaft being measured.

The optical, optoelectronic as well as the radio signal type of torque testing devices have suffered from the disadvantages that they are expensive to install as well as maintain in optimum operating condition.

Typically, the ferromagnetic type of signal generating torque metering devices, which have enjoyed widespread acceptance, have employed a pair of exciter wheels, namely a reference exciter and a torque indication exciter. These types of measuring apparatus have the disadvantage that they cannot be installed and maintained easily by relatively unskilled workers so that errors introduced as the result of minor structural anomalies in the torquemeter shaft or anomalies that are not cause for rejecting the shaft are detected which may be caused by minor deviations in the shape of the shaft during operation. In the case of a torquemeter system using a bearing support, it has been determined that the ferromagnetic based type of torque metering devices have failed to properly measure torque magnitudes imposed on a rotating shaft due to the installation geometry and which may generate false torque readings. These and other types of ferromagnetic based signalling and measuring devices have unnecessarily increased the cost of torque measurement without any corresponding increase in accuracy. Prior patents representative of the foregoing are U.S. Pat. Nos. 3,587,305 and 3,548,649, the disclosures of which are incorporated herein by reference. Further, conventional devices, such as the device disclosed in U.S. Pat. No. 5,228,349, incorporate non-ferromagnetic but conductive gear shrouds. However, these devices have been found to be inaccurate.

SUMMARY OF THE INVENTION

The present invention avoids the drawbacks of the prior art devices discussed above as well as provides a less expensive yet more accurate measurement of torque imposed on a rotating body such as a hollow or solid drive shaft without adversely affecting the subsequent use of the tested shaft in its intended environment.

In one embodiment, a reference and a torque indicating exciter wheel are installed on a shaft for rotation about the rotational axis of the shaft with the attachment portions spaced apart a selected distance but with the wheels adjacent so that the signal generating elements of each wheel will be interspaced. The torque indicating exciter wheel is mounted on one end of a sleeve of composite material while the opposite end of the sleeve is secured to the surface of the shaft being measured. The one end of the sleeve is spaced radially outwardly of the torque shaft surface and is unconnected to the shaft thereby simplifying the construction of the measuring apparatus and assuring accuracy in the torque measurement. Spaced radially outwardly of the signal generating elements are a pair of reluctance type sensors which are mounted in a plane intersecting the axis of the shaft perpendicularly and spaced 180° apart, to compensate any non-arcuate relative motion between the reference sleeve and the torque shaft.

The foregoing and other objects of the invention will become apparent as consideration is given to the following detailed description taken in conjunction with the accompanying drawings, in which:

BRIEF DESCRIPTION OF THE DRAWINGS

FIG. 3a is a schematic illustration of two sensing elements one of which would be attached to one portion of a shaft and the other of which would be attached to a spaced apart portion of the torque shaft while FIG. 3b is an illustration of an anomalous configuration of the assembled sensors of FIG. 3a;

FIG. 4 is a sectional view looking transverse to the longitudinal axis of a shaft with the torque metering device of the present invention installed.

DETAILED DESCRIPTION OF THE INVENTION

Figure 1:
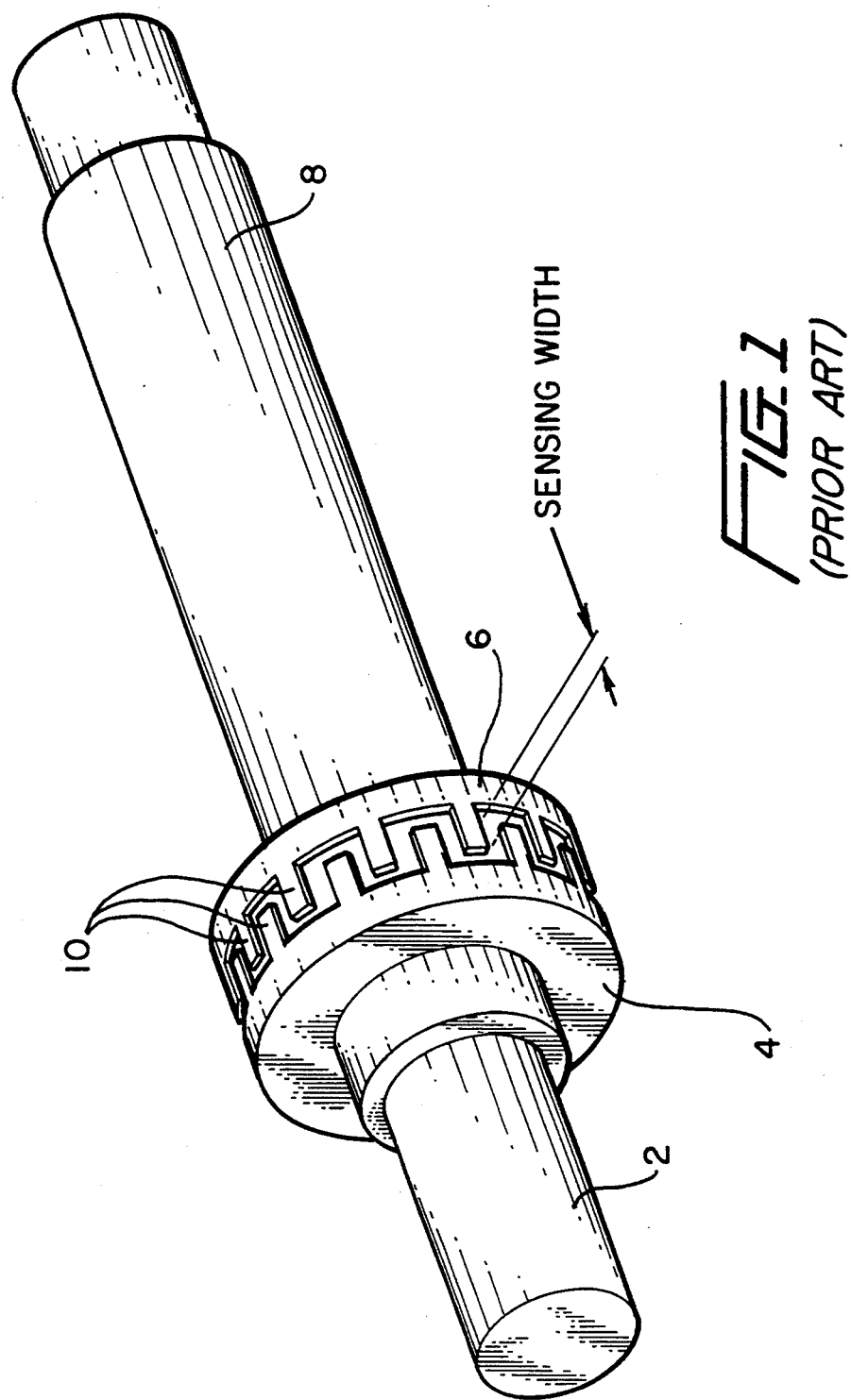
FIG. 1 is a perspective view of a prior art torque metering device.
Figure 2:
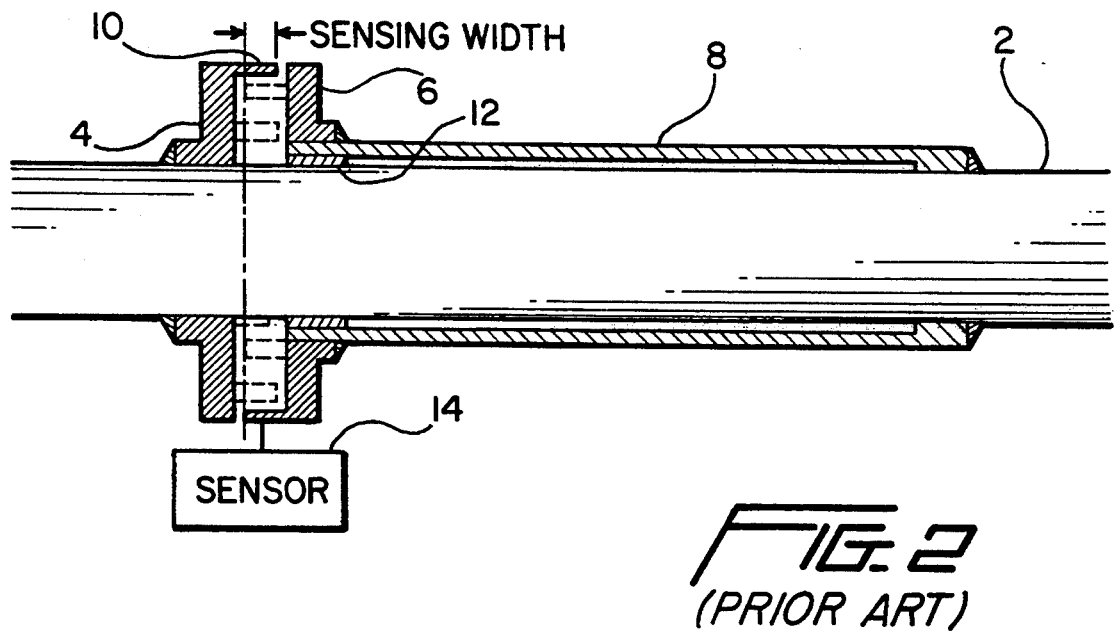
FIG. 2 is a sectional view looking transverse to the longitudinal axis of the shaft to FIG. 1.

Referring now to the drawings where like numerals designate corresponding parts throughout the several views, there is shown in FIGS. 1 and 2 the torque measuring apparatus according to the U.S. Pat. No. 3,548,649 granted Dec. 22, 1970. In the device illustrated, a shaft 2 which may be solid or hollow is equipped with two signal generating exciter wheels 4 and 6. Exciter wheel 4 may be welded or adhesively secured to the exterior surface of the shaft 2. Exciter wheel 6 is fastened to a sleeve 8, a remote end of which is secured to the exterior of shaft 2. The end of the sleeve 8 adjacent the exciter wheel 4 is provided with a bearing sleeve 12 surrounding the shaft 2 and separating and supporting the free end of the sleeve 8 from the shaft 2 as shown in FIG. 2. The purpose of the bearing is to provide lateral stability and to minimize lateral vibrations of the sleeve 8. A radial clearance allow relative rotational freedom of movement.

As shown in FIG. 1, the exciter wheels 4 and 6 are each provided with a plurality of teeth 10 which are interspaced in a substantially uniform manner. When the shaft 2 is rotated from a coupling (not shown) located at one end of the shaft 2, torque will be imposed along the longitudinal axis of the shaft 2 and any such torque will be manifested in a variation in the arcuate distance between the teeth of exciter wheel 4 and those of exciter wheel 6. To sense this, a sensor 14 is located spaced radially outwardly of the circumferential path of the teeth 10 as illustrated in FIG. 2, As explained in U.S. Pat. No. 3,548,649, the disclosure of which is incorporated herein by reference, the sensor 14 will detect the presence and absence of the teeth adjacent thereto as the shaft 2 is rotated and any displacement in the signal amplitude generated will provide a phase difference which is a measure of the torque imposed on the shaft at least between the points where the exciter wheels 4 and 6 are fastened to the shaft.

A problem with the arrangement described above and illustrated in U.S. Pat. No. 3,548,649 will arise as a result of the use of the bearing member 12. Also, it is both time consuming and expensive to install the bearing member as an additional element of the torquemeter apparatus. Moreover, it has been found that the use of the bearing member 12 introduces a detrimental influence on the measurement which, in some cases, may mask the actual torque quantity exhibited by the shaft itself, as explained below.

With reference now to the schematic illustration of FIG. 3a, exciter wheel 14 is represented by the illustrated circle while the exciter teeth are illustrated as at 15 and exciter wheel 16 is provided with exciter teeth represented at 17, the number of teeth being reduced to simplify the illustration. The intermeshing of the teeth is illustrated in FIG. 3b but with the discs 14 and 16 offset with respect to the axis of rotation 20 of the shaft to be measured. It has been found that this type of offset intermeshing (or non-arcuate displacement between the teeth) is frequently encountered and is a result of high speed rotation of the shaft under a load, bending of the shaft due to gravity or misalignment in the drive and takeoff from the torque shaft. Other factors may obviously influence the alignability of the two exciter wheels 14 and 16 but the foregoing are believed to be the major factors resulting in measurement inaccuracies.

As mentioned above and discussed in detail in U.S. Pat. No. 3,548,649, a single sensor 22 is located immediately adjacent the outer periphery of the exciter wheels 14 and 16. However, where the shaft 2 exhibits any non-uniformity or distortion as a result of its weight, bending or the torque imposed on the shaft, one of the exciter wheels such as 16 in the illustrated example, will be shifted so that its axis of rotation 26 will not coincide with that of the other exciter wheel 14 as at 20. As a consequence, the distance between exciter fingers such as at 15' and 17' could be reduced between the 12 o'clock and 1 o'clock position as viewed in FIG. 3b while, when the same exciter fingers or teeth 15' and 17' reach the 6 o'clock position in FIG. 3b, the distance therebetween will have increased due to the shifting of the axis of rotation at least at the point of attachment of the exciter wheels to the shaft being tested. Where a bearing 12 is introduced as in the prior art arrangement of FIG. 2, the lateral shifting of the axes is possible due the clearance between bearing 12 and the shaft 2. Even if this clearance is theoretically zero, lateral deflection will still occur; like any mechanical element, the bearing has a certain lateral stiffness and will deflect by a proportional amount under the bending load. As explained above, this shifting is a cause for errors, as a single sensor will interpret the lateral motion as a change in torque.

The presence of the bearing can negatively affect the precision of the torquemeter system due to frictional effects. Usually, this bearing is of the sliding friction type as in U.S. Pat. No. 3,548,649, but rolling friction ball bearings can also be used as disclosed in U.S. Pat. No. 4,590,806. Even though the frictional movement in the bearing is much smaller than the torque to be measured, its presence is a source of errors: the friction coefficients can change in time due to temperature variations or changes in the condition of the contact surfaces. Such changes can also occur if impurities such as sludge accumulates in the critical contact area. The working environment for torquemeters and couplings in general is notoriously dirty, and such accumulations are very likely to occur, causing errors in the displayed torque, or even costly shut-downs of the entire equipment for clean-up of the bearings.

The present invention avoids the use of a bearing and provides superior accuracy in measuring torque imposed on a rotating shaft by the use of a second sensing element 24 which may be utilized with the same test circuitry as that illustrated in FIG. 2 of U.S. Pat. No. 3,548,649 and which is preferably located 180° from the location of the electromagnetic sensor 22 and the elimination of the bearing 12. Instead of a metal sleeve 8, according to the present invention, a composite material sleeve 44 is employed. With this arrangement, it has been found that eccentric rotations of the two shaft parts or portions where the exciter wheels 14 and 16 are fixedly attached can be readily compensated for by the relatively inexpensive provision of the two sensing devices 22 and 24 located 180° apart about the circumference of the exciter wheels. In addition, it has been found that a cantilevered type of mounting for one of the exciter wheels on a composite sleeve 44 as described below will increase the benefits of accurate torque manifestation as taught by U.S. Pat. No. 3,548,649 but without introducing the cost and complication of resorting to a bearing member to support the free end of the sleeve 44.

One such arrangement of the present invention is shown in FIG. 4 which is a sectional view of one-half of a shaft 30 which is symmetrical about its axis of rotation 32. At one end there is provided a flange 34 for attachment to another shaft, a support or gearing, as desired and at the opposite end a similar flange 36 is provided. Each of the flanges will have a plurality of bores such as at 38 to facilitate attachment by bolts to other equipment. According to the present invention, the shaft 30 has, intermediate flanges 34 and 36, a first exciter wheel 40 attached as by welding, bolting or the like represented at 42. The wheel 40 may be identical to the exciter wheel 4 of FIG. 1. At another portion of the shaft 30, one end 46 of the composite material sleeve 44 is rigidly fixed as by adhesive or mechanical attachment or the like as represented in dotted lines 48, and the other end is free.

Since such a torquemeter device is primarily used in high speed applications, special care must be exercised in the construction of the cantilevered system, to insure its lateral stability, minimize vibrations and avoid any non-elastic movement between sleeve 44 and shaft 30 at the fixed end. It has been determined that the sleeve 44 should be of a light, yet relatively stiff, material. It has also been found that individual attachment means to the shaft 30 will not provide a sufficiently rigid connection. In the preferred embodiment, mechanical attachment 48 represents a combination of attachments which include a press-fit connection at the sleeve/shaft interface, adhesive, and at least two mechanical fasteners, such as rivets or bolts.

Preferably, the sleeve 44 is a carbon epoxy material and may have a length of approximately 1 meter. With this type of distance between the point of attachment 48 of one end of the sleeve 44 and the point of attachment 42 of the exciter wheel 40, the torque metering device will be sensitive to even very low torque impositions.

As shown in FIG. 4, a second exciter ring 50 is secured as by epoxy adhesive to the interior free end of the sleeve 44. One tooth of the ring 50 is shown at 52 projecting from the ring 50. A plurality of such teeth 52 are provided to assume an interspaced relationship with the fingers 53 of the exciter wheel 40, as in U.S. Pat. No. 3,548,649. According to the present invention, a fiberglass epoxy ring 54 overlies the teeth 52 as explained below.

Figure 5:
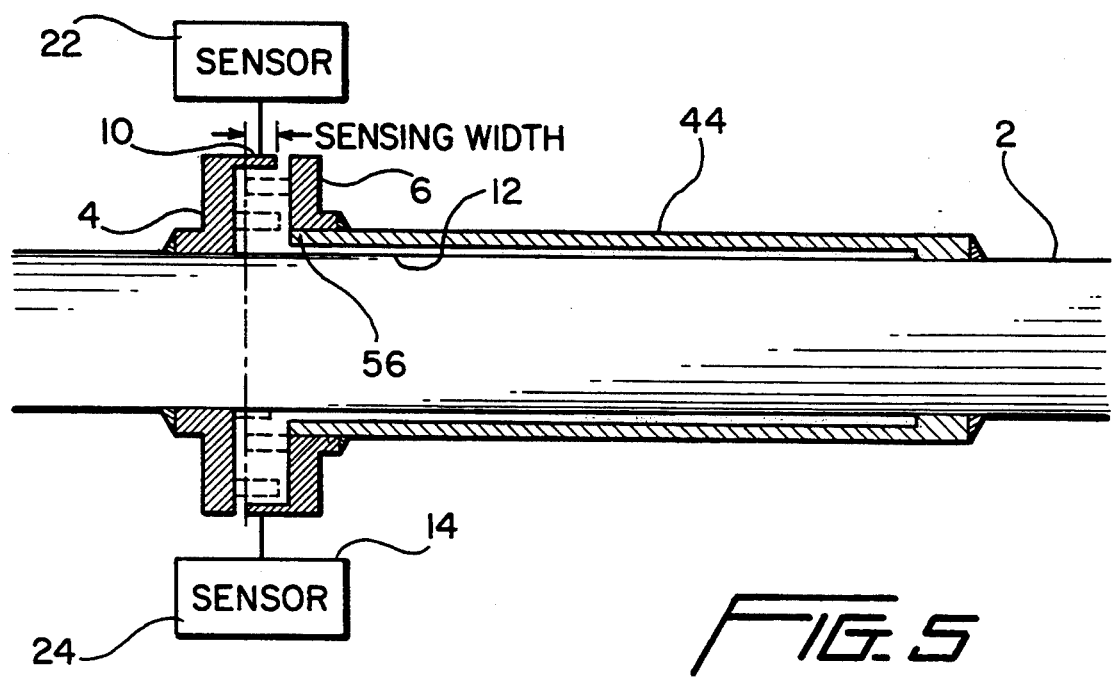
FIG. 5 is a simplified variation of the assembly of FIG. 4.

As shown in FIG. 5, two sensors 22 and 24 are installed 180° apart about the circumference of the shaft 30 and spaced only slightly radially outwardly of the fiberglass epoxy ring 54.

By making the sleeve 44 of a composite carbon-epoxy material, it has been found that significant stability in operation and reduced weight is achieved over a similar sleeve such as shown in U.S. Pat. No. 3,548,649 which is made of metal.

It has been found that the pickup sensitivity of the electromagnetic sensors 22 and 24 would be impaired by the presence of conductive carbon between the detecting end of each sensor 22 or 24 and the exciter teeth 52 and 53. Thus, the present invention utilizes the non-conductive fiberglass epoxy ring 54 in the manner described above. With the foregoing arrangement, any variation or shifting of the respective axes of rotation 20 or 26 at the portion of the shaft 30 where the exciter wheels 40 and 50 are secured will result in a non-arcuate change in the gap between the teeth of each of the exciter wheels 40 and 50 which would normally be interpreted by a single sensor as a torque increment when in fact the difference in spacing between the exciter teeth is due to a shifting between the axes of rotation 20 and 26 as illustrated in FIG. 3b.

By the use of two sensors 22 and 24 spaced 180° apart and lying in the same plane about the circumference of the exciter wheels and the shaft, the true torque imposed on the shaft by rotation of the shaft can be shown mathematically to constitute the average indication of the two sensors with the circuit described in U.S. Pat. No. 3,548,649. In simplified terms, one sensor detects an exciter teeth gap equal A+B while the other sensor will detect a gap of A−B where A is the true torque deflection and B is a lateral deflection as noted in U.S. Pat. No. 3,587,305. However the use of four sensors is eliminated in the present invention. Clearly, the average of the two signals is equal to A irrespective of the actual magnitude of B.

The sensors will be connected to a computer which will analyze the data received from the sensors and display a readout of the torque relative to the speed of rotation or per unit of time.

The carbon-epoxy composite sleeve 44 is preferred in high speed applications and it will be understood that other materials may be used including light metals in low speed applications. In any application, as illustrated in FIG. 5, it is important that the free end 56 of the sleeve 44 be spaced radially outwardly of the surface of the shaft so that the only factor affecting the position of the exciter fingers 50 relative to the exciter fingers 53 of the wheel 40 is the rotational motion (or twist) difference of the shaft 40 at the point 46 where the attachment 48 of the sleeve 44 is affected.

As it will be apparent to those skilled in this art, the longer the sleeve 44 the more sensitive will be the torque meter to any torque variations.

Having described the invention, it would be apparent to those skilled in this art that various modifications may be made thereto without departing from the spirit and scope of this invention as defined in the appended claims.

What is claimed is:

1. A measuring apparatus for measuring the amount of torque experienced by a body rotating about an axis of the body, said apparatus comprising
   a first indicating member comprising a support member having a first end for connection to a first portion of the rotating body so that said first indicating member will rotate with the body and a second end spaced from said first end and overlying a portion of the body and spaced radially outwardly of the body so as to be free of contact with said body, said second end including a plurality of signal generating elements uniformly spaced about said second end so as to be evenly positioned about the axis of rotation of the body;
   a second indicating member for connection to a second portion of the rotating body for rotation with the body, said second indicating member including a plurality of signal generating elements positionable in interspaced relation with said plurality of signal generating elements of said first indicating member,
   at least two sensing elements disposed in sensing relation to said pluralities of signal generating elements and spaced apart a selected angular distance perpendicular to the axis of rotation of the body.

2. The invention as claimed in claim 1 wherein the body is a cylindrical shaft having a longitudinal axis of rotation and said first and second indicating members each include ring shaped portions connected to said respective first and second portions of the shaft.

3. The invention as claimed in claim 2 wherein said plurality of signal generating elements of said first and second indicating members are each ferro-magnetic sites.

4. The invention as claimed in claim 3 wherein said sensing elements are magnetic sensors spaced apart 180° relative to the axis of rotation.

5. The invention as claimed in claim 4 wherein said magnetic sensors are electro-magnetic sensors which are connected to an analyzing device provided with a read out to indicate any variation in the spacing between adjacent signal generating elements of said first and second indicating members.

6. The invention as claimed in claim 1 wherein said support member of said first indicating member includes a tubular body having a diameter selected to receive the rotating body, said tubular body being made of a carbon composite material.

7. The invention as claimed in claim 6 wherein said tubular body is coupled to said rotating body by a press-fit between said tubular body and said rotating body, by adhesive, and by at least two fastener.

8. The invention as claimed in claim 6 wherein said signal generating elements are a plurality of magnetic fingers extending from said second end of said tubular body and parallel to the axis of rotation of said tubular body.

9. A measuring apparatus for measuring the amount of torque experienced by a body rotating about an axis of the body, said apparatus comprising a first indicating member comprising a support member having a first end for connection to a first portion of the rotating body so that said first indicating member will rotate with the body and a second end spaced from said first end and overlying a portion of the body and spaced radially outwardly of the body, said second end including a plurality of signal generating elements uniformly spaced about said second end so as to be evenly positioned about the axis of rotation of the body, said support member being a sleeve of carbon base material;

a second indicating member for connection to a second portion of the rotating body for rotation with the body, said second indicating member including a plurality of signal generating elements positionable in interspaced relation with said plurality of signal generating elements of said first indicating member, at least two sensing elements disposed in sensing relation to said pluralities of signal generating elements and spaced apart a selected angular distance perpendicular to the axis of rotation of the body, said signal generating elements of said first indicating member being surrounded by a non-conducting material ring.

10. The invention as claimed in claim 9 wherein said material ring is fiberglass epoxy composite.

11. The invention as claimed in claim 9 wherein the body is a cylindrical shaft having a longitudinal axis of rotation and said first and second indicating members each include ring shaped portions connected to said respective first and second portions of the shaft.

12. The invention as claimed in claim 9 wherein said plurality of signal generating elements of said first and second indicating members are each ferro-magnetic sites.

13. The invention as claimed in claim 12 wherein said sensing elements are magnetic sensors spaced apart 180° relative to the axis of rotation.

14. The invention as claimed in claim 13 wherein said magnetic sensors are electro-magnetic sensors which are connected to an analyzing device provided with a read out to indicate any variation in the spacing between adjacent signal generating elements of said first and second indicating members.

15. The invention as claimed in claim 9 wherein said support member of said first indicating member includes a tubular body having a diameter selected to receive the rotating body and with said second end out of contact with the body.

16. The invention as claimed in claim 15 wherein said signal generating elements are a plurality of ferro-magnetic fingers extending from said second end of said tubular body and parallel to the axis of rotation of said tubular body.

17. The invention as claimed in claim 1 wherein said signal generating elements of said first indicating member are surrounded by a non-conducting material ring.

18. The invention as claimed in claim 17 wherein said material ring is fiberglass epoxy composite.

* * * * *